US012554779B1

(12) United States Patent
Hartmann et al.

(10) Patent No.: US 12,554,779 B1
(45) Date of Patent: Feb. 17, 2026

(54) GENERATING CONTENT ITEMS BASED ON SOURCE DOCUMENT METADATA USING A GENERATIVE NEURAL NETWORK

(71) Applicant: Google LLC, Mountain View, CA (US)

(72) Inventors: Florian Nils Hartmann, Zurich (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/909,815

(22) Filed: Oct. 8, 2024

(51) Int. Cl.
*G06F 16/93* (2019.01)
*G06F 16/9038* (2019.01)

(52) U.S. Cl.
CPC .......... *G06F 16/93* (2019.01); *G06F 16/9038* (2019.01)

(58) Field of Classification Search
CPC ............................. G06F 16/93; G06F 16/9038
See application file for complete search history.

(56) References Cited

U.S. PATENT DOCUMENTS

| | | | |
|---|---|---|---|
| 11,962,546 B1 | 4/2024 | Hattangady et al. | |
| 2022/0139385 A1 | 5/2022 | Cheng et al. | |
| 2024/0095491 A1 | 3/2024 | Birru et al. | |
| 2024/0296279 A1* | 9/2024 | Gardner | G06F 40/169 |

OTHER PUBLICATIONS

Adiwardana et al., "Towards a Human-like Open-Domain Chatbot," CoRR, Submitted on Feb. 27, 2020, arXiv:2001.09977v3, 38 pages.
Agostinelli et al., "MusicLM: Generating Music From Text," CoRR, Submitted on Jan. 26, 2023, arXiv:2301.11325v1, 15 pages.
Anil et al., "PaLM 2 Technical Report," CoRR, Submitted on Sep. 13, 2023, arXiv:2305.10403v3, 93 pages.
Borsos et al., "Audiolm: a language modeling approach to audio generation," IEEE/ACM Transactions on Audio, Speech, and Language Processing, Jun. 2023, 31:2523-2533.
Brown et al., "Language models are few-shot learners," CoRR, Submitted on Jul. 22, 2020, arXiv:2005.14165v4, 75 pages.
Chang et al., "MaskGIT: Masked Generative Image Transformer," CoRR, Submitted on Feb. 8, 2022, arXiv:2202.04200v1, 23 pages.
Chang et al., "Muse: Text-to-image generation via masked generative transformers," CoRR, Submitted on Jan. 2, 2023, arXiv:2301.00704v1, 22 pages.

(Continued)

*Primary Examiner* — Hau H Hoang
(74) *Attorney, Agent, or Firm* — Fish & Richardson P.C.

(57) ABSTRACT

Methods, systems, and apparatus, including computer programs encoded on computer storage media, for generating content items based on source document metadata using a generative neural network. One of the methods include: receiving, from a user, a request to generate a content item using a generative neural network conditioned on a context input, wherein the context input comprises content derived from a source electronic document; obtaining metadata associated with the source electronic document; generating a prompt for the generative neural network based on the context input and the metadata associated with the source electronic document; processing the prompt using the generative neural network to generate the content item; and providing the content item for presentation to the user.

30 Claims, 4 Drawing Sheets

(56) References Cited

OTHER PUBLICATIONS

Cheung, "Understanding the Anatomies of LLM Prompts: How to Structure Your Prompts to Get Better LLM Responses, " Mar. 20, 2024, retrieved on Jul. 23, 2025, retrieved from Internet Archive: Wayback Machine URL<https://web.archive.org/web/20250419011725/https://www.codesmith.io/blog/understanding-the-anatomies-of-llm-prompts>, 27 pages.
Chowdhery et al., "PaLM: Scaling Language Modeling with Pathways," CoRR, Submitted on October S, 2022, arXiv:2204.02311v5, 87 pages.
Raffel et al., "Exploring the limits of transfer learning with a unified text-to-text transformer," CoRR, Submitted on Oct. 24, 2019, arXiv:1910.10683v2, 53 pages.
Ramesh et al., "Hierarchical text-conditional image generation with clip latents," CoRR, Submitted on Apr. 13, 2022, arXiv:2204.06125v1, 27 pages.
Rombach et al., "High-resolution image synthesis with latent diffusion model," Paper, Presented at Proceedings of the IEEE/CVF Conference: Computer Vision and Pattern Recognition, New Orleans, LA, Jun. 18-24, 2022, pp. 10684-10695.
Saharia et al., "Photorealistic text-to-image diffusion models with deep language understanding," Paper, Presented at the 36th Conference on Neural Information Processing Systems, New Orleans, LA, Nov. 28-Dec. 9, 2022; Advances in Neural Information Processing Systems, Dec. 2022, 35:1-16.
Zeng et al., "Large Language Models for Social Networks: Applications, Challenges, and Solutions," CoRR, Submitted on Jan. 4, 2024, arXiv:2401.02575v1, 50 pages.

* cited by examiner

GENERATING CONTENT ITEMS BASED ON SOURCE DOCUMENT METADATA USING A GENERATIVE NEURAL NETWORK

BACKGROUND

This specification relates to processing inputs using neural networks to generate content items. For example, the content items can include text data, image data, video data, audio data, or the like.

Neural networks are machine learning models that employ one or more layers of nonlinear units to predict an output for a received input. Some neural networks include one or more hidden layers in addition to an output layer. The output of each hidden layer is used as input to the next layer in the network, i.e., another hidden layer or the output layer. Each layer of the network generates an output from a received input in accordance with current values of a respective set of parameters.

SUMMARY

This specification describes a content item generation system implemented as computer programs on one or more computers in one or more locations that generates content items based on source document metadata using a generative neural network.

According to an aspect, there is provided a method performed by one or more computers. The method comprises: receiving, from a user, a request to generate a content item using a generative neural network conditioned on a context input, wherein the context input comprises content derived from a source electronic document; obtaining metadata associated with the source electronic document; generating a prompt for the generative neural network based on the context input and the metadata associated with the source electronic document; processing the prompt using the generative neural network to generate the content item; and providing the content item for presentation to the user.

Generating the prompt for the generative neural network may comprise: generating the prompt that comprises the context input and the metadata.

Generating the prompt for the generative neural network may comprise: generating the prompt that comprises the context input, the metadata, and additional information that is generated based on the metadata associated with the source electronic document and metadata associated with the generative neural network.

The metadata associated with the generative neural network may comprise a cutoff date of the generative neural network, the cutoff date representing a most recent publication date of data included in the training data used to train the generative neural network.

Obtaining the metadata associated with the source electronic document may comprise: receiving the metadata from an operating system that is running on the one or more computers.

Obtaining the metadata associated with the source electronic document may comprise: performing a search in a corpus of documents to identify an electronic document that is relevant to the content; and using metadata associated with the identified electronic document as the metadata associated with the source electronic document.

The content derived from the source electronic document may comprise content copied from the source electronic document.

According to another aspect, there is provided one or more computer-readable storage media encoded with instructions that, when executed by one or more computers, cause the one or more computers to perform the operations of the above method aspect.

According to a further aspect, there is provided a system comprising one or more computers and one or more storage devices storing instructions that when executed by one or more computers cause the one or more computers to perform the respective operations of the above method aspect.

The subject matter described in this specification can be implemented in particular embodiments so as to realize one or more of the following advantages.

Generally, content item generation systems can use a generative neural network to generate a content item conditioned on a context input that provides context for the content item. Often, the context input that is provided to the system includes content derived, e.g., transferred, from a source electronic document. Conventionally, metadata related to the source electronic document is ignored and does not make its way into the content item generation process, even though it may contain additional information that can be used to boost the performance of generative neural network to generate content items that have improved quality or improved relevance to the context input.

Using techniques described in this specification, the content item generation system can incorporate metadata related to the source electronic document into a prompt for processing by the generative neural network to enable the generative neural network to generate a higher quality content item, e.g., a content item that is more informative and more pertinent to the context input. This ability to generate higher quality of content items also improves user experience with the content item generation system.

The metadata, which can be obtained by the content item generation system by using the techniques described in this specification, can include information such as the origin, the creation date and time, and the publication date of the source electronic document. The metadata thus encodes additional information that is relevant to the generative task, e.g., information that is richer than the derived content alone or information that can attribute the derived content to a particular source, but is nevertheless missing from the context input originally received by the system. Thus, the content items generated by the described system can be more informative and more pertinent to context inputs than content items generated based on the context inputs alone.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
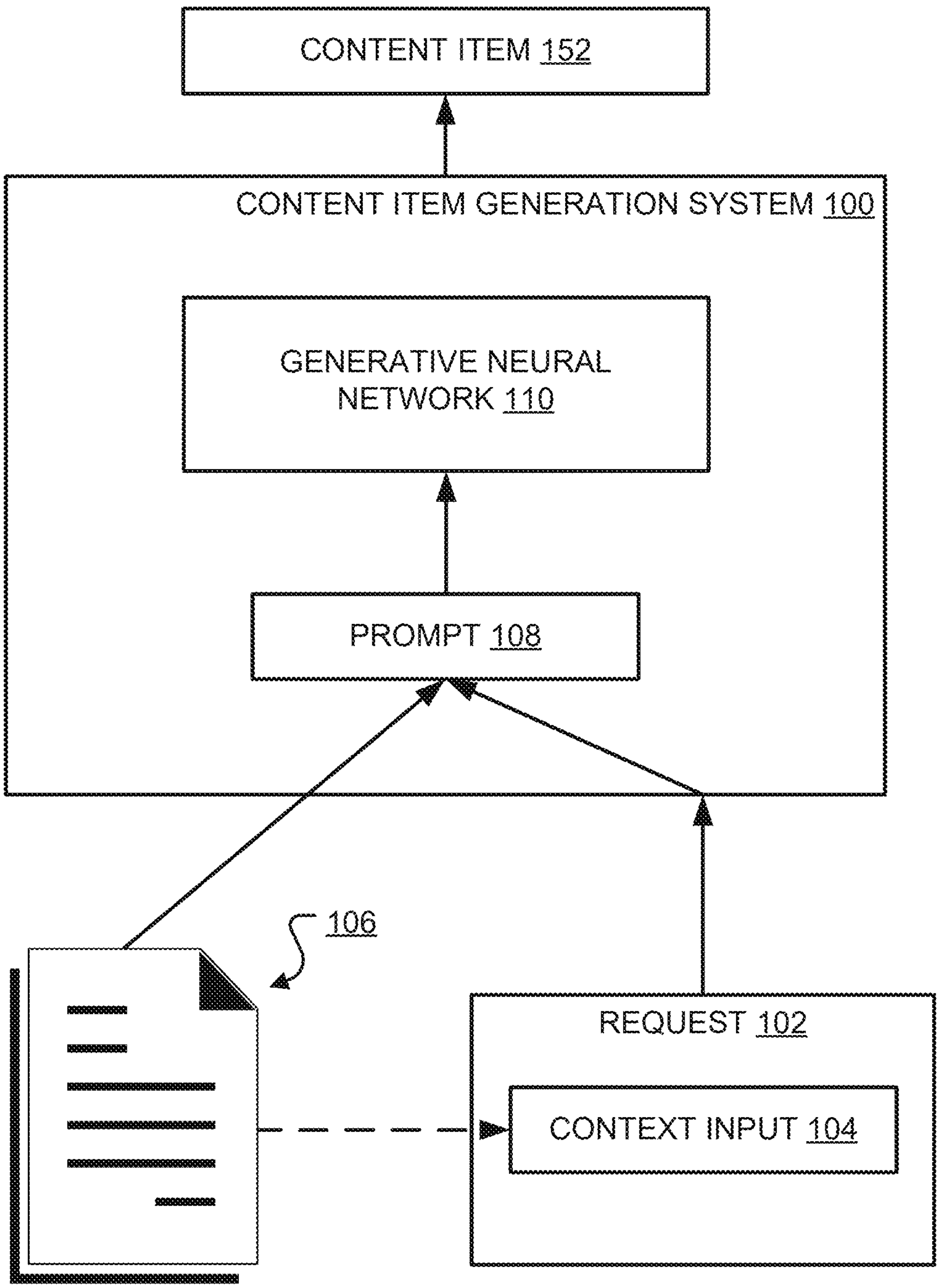
FIG. 1 is a diagram of an example content item generation system.

FIG. 1 is a diagram of an example content item generation system 100. The content item generation system 100 is an example of a system implemented as computer programs on one or more computers in one or more locations, in which the systems, components, and techniques described below can be implemented.

The content item generation system 100 is a system that generates content items 152 using a generative neural network 110 conditioned at least on the context inputs 104.

For example, the content item generation system 100 can receive a context input 104 as part of, or associated with, a request 102 for a content item 152 and, in response, use the generative neural network 110 to process a prompt 108 that includes the context input 104 to generate the content item 152.

The content item generation system 100 can generate any kind of content items 152, e.g., textual content items, image content items, video content items, audio content items, and so on.

The content items 152 generated by the content item generation system 100 can be used in any of a variety of ways. For example, the system can provide the content items 152 for presentation to a user on a display device. As another example, the system can provide the content items 152 to another component in the system or a different system for further processing. As yet another example, the system can store the content items 152 in a data repository for some future purpose.

In some cases, the content item generation system 100 can be a text generation system that generates text sequences, i.e., each content item 152 generated by the system is an output sequence of text that includes a sequence of text tokens from a vocabulary of text tokens that includes, e.g., one or more of characters, sub-words, words, punctuation marks, numbers, or other symbols that appear in a natural language or a computer language. For example, the system can generate text sequences in response to a context input 104 provided by a user of the system and provide the text sequences for presentation to the user who provided the context input 104.

For example, the context input 104 can be an input sequence of text and the output sequence is another sequence of text, e.g., a translation of the input sequence of text, a completion of the input sequence of text, a paraphrase of the input sequence of text, a response to a question posed in the input sequence, or a sequence of text that is about a topic specified by the input sequence of text. As another example, the context input 104 can be an input other than text, e.g., an image, a video, or an audio, and the output sequence can be text that describes the input.

As a particular example, the content item generation system 100 can be part of a dialog system and the context input 104 can include audio or text from the most recent conversational turn submitted by a user of the dialog system during the dialog while the output sequence of text is the next turn in the conversation, e.g., either text or audio that is a response to the most recent conversational turn. Optionally, the context input 104 can also include one or more historical conversational turns that occurred earlier in the conversation.

As another particular example, the content item generation system 100 can be part of a computer code generation system and the context input 104 can be a text description of a desired piece of code or a snippet of computer code in a programming language and the output sequence of text can be computer code, e.g., a snippet of code that is described by the context input or a snippet of code that follows the context input in a computer program.

In some cases, the content item generation system 100 can be an image or video generation system that generates images or videos that each have multiple frames (where each frame is an image) by generating images, e.g., either as sequences of pixels or through an iterative denoising process. For example, the content item generation system 100 can generate an image or a video conditioned on a context input 104 provided by a user of the system that includes a text description of the content of the image or the video.

In some cases, the content item generation system 100 can be an audio generation system that generates audio signals, e.g., each content item 152 is an output audio example that includes a sample of an audio wave at each of a sequence of output time steps that span a specified time window. For example, the content item generation system 100 can generate an audio conditioned on a context input 104 provided by a user of the system that includes a text description of the content of the audio.

In these cases, the output time steps can be arranged at regular intervals within the specified time window. The audio sample at a given output time step can be an amplitude value of the audio wave or an amplitude value that has been compressed, companded, or both. For example, the audio sample can be a raw amplitude value or a mu-law companded representation of the amplitude value.

In many scenarios, the context input 104 includes content derived, e.g., transferred, from a source electronic document 106. An electronic document is data that presents a set of content. Examples of electronic documents include webpages, word processing documents, portable document format (PDF) documents, images, videos, audios, source code files, and feed sources. Native applications (e.g., "apps" and/or applications), such as applications installed on mobile, tablet, or desktop computing devices are also examples of electronic documents.

The source electronic document 106 has metadata associated with it. Examples of such metadata include: the date and time the source electronic document 106 is created or last modified, the publication date of the source electronic document 106, the title or filename of the source electronic document 106, the owner or author (either an individual or an organization) of the source electronic document 106, the release or version number of the source electronic document 106, the origin of the source electronic document 106, e.g., a network location of the source electronic document 106, such as the universal resource locator (URL), the source host name, the source domain name, or the source Internet Protocol (IP) address, and so forth.

The content derived from the source electronic document 106 also has metadata associated with it. Examples of such metadata include: the data and time the content is copied from the source electronic document 106, the position of the content within the source electronic document 106, e.g., a line number or byte offset within the source electronic document 106, surrounding context around the content, the size of the content, and so forth.

In these scenarios, performance of a generative neural network 110 on many content generation applications, e.g., conditional text, image, video, or audio generation tasks, can be improved when the generative neural network 110 is provided with not only the content derived from the source electronic document 106, but also the metadata associated with the source electronic document 106, the content, or both, and possibly other metadata, e.g., metadata associated with the generative neural network 110 itself.

When provided as part of a prompt 108 to the generative neural network 110 for processing, the metadata can improve the performance of the generative neural network 110 to facilitate the generation of a higher quality content item, e.g., a content item 152 that is more informative and more pertinent to the context input 104, for a number of reasons.

First, the metadata includes richer information than the derived content alone, and therefore provides additional context for the content item to be generated by the generative neural network 110.

Second, the metadata can attribute the derived content to a particular source, and thus facilitate the generation of a content item that is a more pertinent response to the context input 104 that includes the derived content, because the generative neural network 110 now has access to information about where the derived content originates and when the derived content is created.

As an example, a user transfers a snippet of text (e.g., a news article about a news event) from a webpage to the context input 104, and the context input 104 is an input sequence of text that represents a question posed about the transferred snippet of text (e.g., a question posed about the news event) or another request made with reference to the transferred snippet of text (e.g., a request to summarize the news article). In various cases, the user can transfer the snippet of text by way of copying-and-pasting, cutting-and-pasting, or inputting verbatim or rephrased text by using an input device when providing the context input 104.

In this example, metadata about when the webpage that has the snippet of text is created (and hence implying when the news event happened) can enable the generative neural network 110 to generate a more pertinent content item, e.g., an output sequence that represents an answer that is more pertinent to the snippet of text (e.g., an answer that is more pertinent to the news event) or that represents a more accurate summarization of the news article.

Suppose that the snippet of text is created after a knowledge cutoff date of the generative neural network 110, in some implementations, the generative neural network 110 can generate an output sequence of text by using a search engine (or another external tool that can retrieve external data), and more specifically can generate an output sequence of text based on the up-to-date information included in the search engine results (or external data retrieved by the other external tool).

In other words, the generative neural network 110 can avoid generating an output sequence of text by relying solely on stale information that was available to the generative neural network during training, and thus avoids generating an output sequence of text that is incorrect or at least out-of-date and hence less reliable.

In this example, metadata about where the webpage that has the derived content originates (e.g., where the news article is found) can also enable the generative neural network 110 to generate a more informative content item, e.g., an output sequence that represents a more factually accurate answer to the question posed about the news event.

Suppose that the metadata indicates that the snippet of text originates from a source that is associated with a high level of factual accuracy, the generative neural network 110 can process the context input 104 that includes the snippet of text to generate the output sequence of text. Alternatively, suppose that the metadata indicates that the snippet of text originates from a source that is associated with a low level of factual accuracy, the generative neural network 110 can generate an output sequence of text that indicates the lack of factual accuracy in the snippet of text (e.g., "I don't think this is accurate. Rather, here's what I know about this . . . ")

As another example, a user copies an image from an image source (e.g., from a camera application, a photo album application, or an image/video processing application), and then pastes the copied image into the context input 104, and the context input 104 is a multimodal input sequence of both text and image that represents a question posed about, or a request made with respect to, the copied image. In this example, metadata about when and/or where the image was taken can enable the generative neural network 110 to generate a more pertinent content item.

For example, the metadata can enable the generative neural network 110 to generate an output sequence of text that represents an answer or another response, e.g., a caption, that that is more pertinent to the copied image than an output sequence of text that would be generated without utilizing the metadata.

As another example, the metadata can enable the generative neural network 110 to generate another image that has higher quality (e.g., higher fidelity) than an image that would be generated without utilizing the metadata. For example, the other image can be a modified version of the copied image, e.g., a super-resolution image (that has higher resolution than the copied image), an in-painted image (that reconstructs any missing part in the copied image), or an image that is a predicted next frame of the copied image.

As yet another example, a user transfers a snippet of a text report from a specific software tool to the context input 104, and the context input 104 represents a question posed about, or a request made with respect to, the snippet of text transferred from the specific software tool.

For example, the software tool can be an integrated development environment (IDE) tool, and the snippet of text can include source code snippets, e.g., an incomplete source code snippet, a buggy source code snippet, and so on. As another example, the software tool can be a compiler, and the snippet of text can include error messages included as part of an error report that is generated by a compiler after a compilation process of source code has stopped due to an error that occurs in the source code.

In this example, metadata about the specific software tool (e.g., a compiler version) and metadata about the source code (e.g., an owner or a source of the source code) can enable the generative neural network 110 to generate a more pertinent content item, e.g., an output sequence that is more pertinent to the snippet of text (e.g., a more pertinent answer to a question about why source code snippet has bugs/has failed to compile, or a more accurate completion of the incomplete source code snippet).

To that end, after a user provides a context input 104 that includes content derived, e.g., transferred, from the source electronic document 106, the content item generation system 100 gathers the metadata associated with the source electronic document 106, the metadata associated with the derived content, or both, based on the context input 104, and possibly other metadata, e.g., metadata associated with the generative neural network 110, and then incorporates the metadata into a prompt 108 before processing the context input 104 using the generative neural network 110.

For example, the prompt 108 can include (i) the context input 104 (that is provided by the user) and one or more of: (ii) the metadata associated with the source electronic document 106 (that is obtained by the system), (iii) the metadata associated with the derived content (that is obtained by the system), or (iv) the metadata associated with the generative neural network 110.

In this way, the prompt 108 incorporates richer information, including metadata that was not directly provided by the user as part of, or in association with, the request 102 for the content item 152, thus improving the performance of the generative neural network 110 to facilitate the generation of a higher quality content item 152.

The generative neural network 110 can be any appropriate generative neural network that has a set of generative neural network parameters and that can be used to generate a content item that includes data in a single modality or multiple modalities by processing the prompt 108 in accordance with the set of generative neural network parameters.

In some implementations, the generative neural network 110 can have an architecture that allows the generative neural network 110 to more effectively map a prompt 108 that includes (i) a context input 104 and (ii) metadata to a content item. As one example, the generative neural network 110 can include a prompt encoder sub-network that processes the context input 104 to generate an embedding of the context input 104, a metadata encoder sub-network that processes the metadata to generate an embedding of the metadata, and a core sub-network that processes the embedding of the context input 104 and the embedding of the metadata to generate an content item.

In some implementations, the generative neural network 110 can include a language model neural network, e.g., as the core sub-network mentioned above or as another component of the generative neural network 110, that executes an auto-regressive token generation process to auto-regressively generate a content item 152, e.g., a sequence of text tokens, a sequence of pixel tokens, a sequence of audio tokens, a sequence of multi-modal tokens, e.g., text and pixel tokens, or the like, across multiple time steps, for example by generating one token at each time step conditioned on any tokens that have already been generated in previous time steps.

The language model neural network can have any of a variety of Transformer-based neural network architectures, e.g., encoder-only Transformer architectures, encoder-decoder Transformer architectures, decoder-only Transformer architectures, other attention-based architectures, and so on.

Examples of language model neural networks include those described in Colin Raffel, et al., Exploring the limits of transfer learning with a unified text-to-text transformer. arXiv preprint arXiv:1910.10683, 2019; Daniel Adiwardana, et al., Towards a human-like open-domain chatbot. CoRR, abs/2001.09977, 2020; Tom B Brown, et al., Language models are few-shot learners. arXiv preprint arXiv: 2005.14165, 2020; Aakanksha Chowdhery, et al., PaLM: Scaling Language Modeling with Pathways, arXiv preprint arXiv:2204.02311; Rohan Anil, et al., Palm 2 technical report. arXiv preprint arXiv:2305.10403, 2023; Borsos, Zalán, et al., Audiolm: a language modeling approach to audio generation. IEEE/ACM Transactions on Audio, Speech, and Language Processing (2023); and Agostinelli, Andrea, et al., "Musiclm: Generating music from text." arXiv preprint arXiv:2301.11325 (2023).

In some implementations, the generative neural network 110 can include a diffusion model neural network, e.g., as the core sub-network mentioned above or as another component of the generative neural network 110, that executes a reverse diffusion process to iteratively generate a content item 152, e.g., an image, a video, or an audio, across multiple reverse diffusion steps starting from random noise.

For example, the diffusion model neural network can generate an image by performing a reverse diffusion process to generate a diffusion output that includes or otherwise specifies a plurality of color values for pixels in the image arranged according to a specified order.

As another example, the diffusion model neural network can generate an image by performing a reverse diffusion process to generate a diffusion output that includes or otherwise specifies a plurality of tokens that represent image patch embeddings of the image which can then be processed by a decoder neural network to generate the image.

Examples of diffusion model neural networks include those described in Chitwan Saharia, et al., Photorealistic text-to-image diffusion models with deep language understanding. Advances in Neural Information Processing Systems, 35:36479-36494, 2022; Aditya Ramesh, et al., Hierarchical text-conditional image generation with clip latents. arXiv preprint arXiv:2204.06125; and Robin Rombach, et al., High-resolution image synthesis with latent diffusion model, Proceedings of the IEEE/CVF conference on computer vision and pattern recognition. 2022.

As another example, the diffusion model neural network can generate an image or a video that has multiple frames (where each frame is an image) by iteratively predicting masked tokens over a decoding process in a discrete token space, e.g., as described in Huiwen Chang, et al., Muse: Text-to-image generation via masked generative transformers. arXiv preprint arXiv:2301.00704, 2023, and Huiwen Chang, et al., Maskgit: Masked generative image transformer. arXiv preprint arXiv:2202.04200, 2022.

Figure 2:
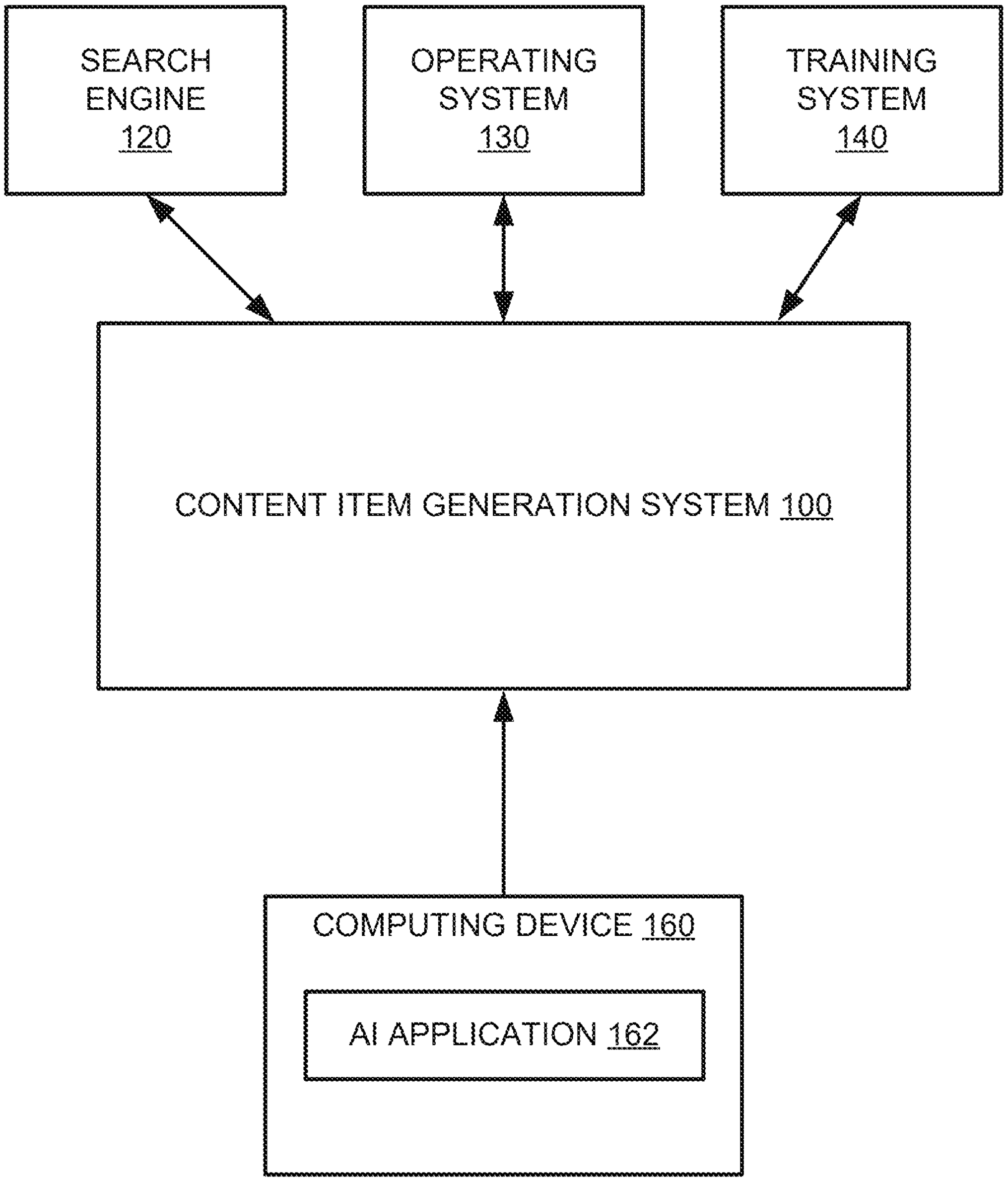
FIG. 2 is a diagram of an example environment that includes a content item generation system.

FIG. 2 is a diagram of an example environment 200 that includes the content item generation system 100 of FIG. 1 and a computing device 160. Additionally, the environment 200 includes at least one of: a search engine 120, an operating system 130, or a training system 140.

In some implementations, the environment 200 can include a network, such as a local area network (LAN), a wide area network (WAN), the Internet, or a combination thereof. The network, when included, connects the content item generation system 100, the computing device 160, and one or more of: the search engine 120, the operating system 130, or the training system 140.

The content item generation system 100 can operate in conjunction with an artificial intelligence software application 162 (or "AI application 162" for short) installed on the computing device 160. Examples of a computing device 160 include personal computers, gaming devices, mobile communication devices, digital assistant devices, augmented reality (AR) devices, virtual reality (VR) devices, wearable devices, and other electronic devices.

A user can utilize the AI application 162 to interact with the content item generation system 100. For example, a user can utilize the AI application 162 to provide a context input 104 as part of, or associated with, a request 102 for a content item 152 by using an input device of the computing device 160, and the generative neural network 110 can provide the content item 152 for presentation to a user within the AI application on a display device of the computing device 160.

Examples of an input device include a keyboard, a mouse, a microphone, an AR/VR input device, a touch screen, and so forth. Examples of an output device include a monitor, a screen, a speaker, and so forth. The output device can be used to display images, text, video, and/or play audio to a user.

Figure 3:
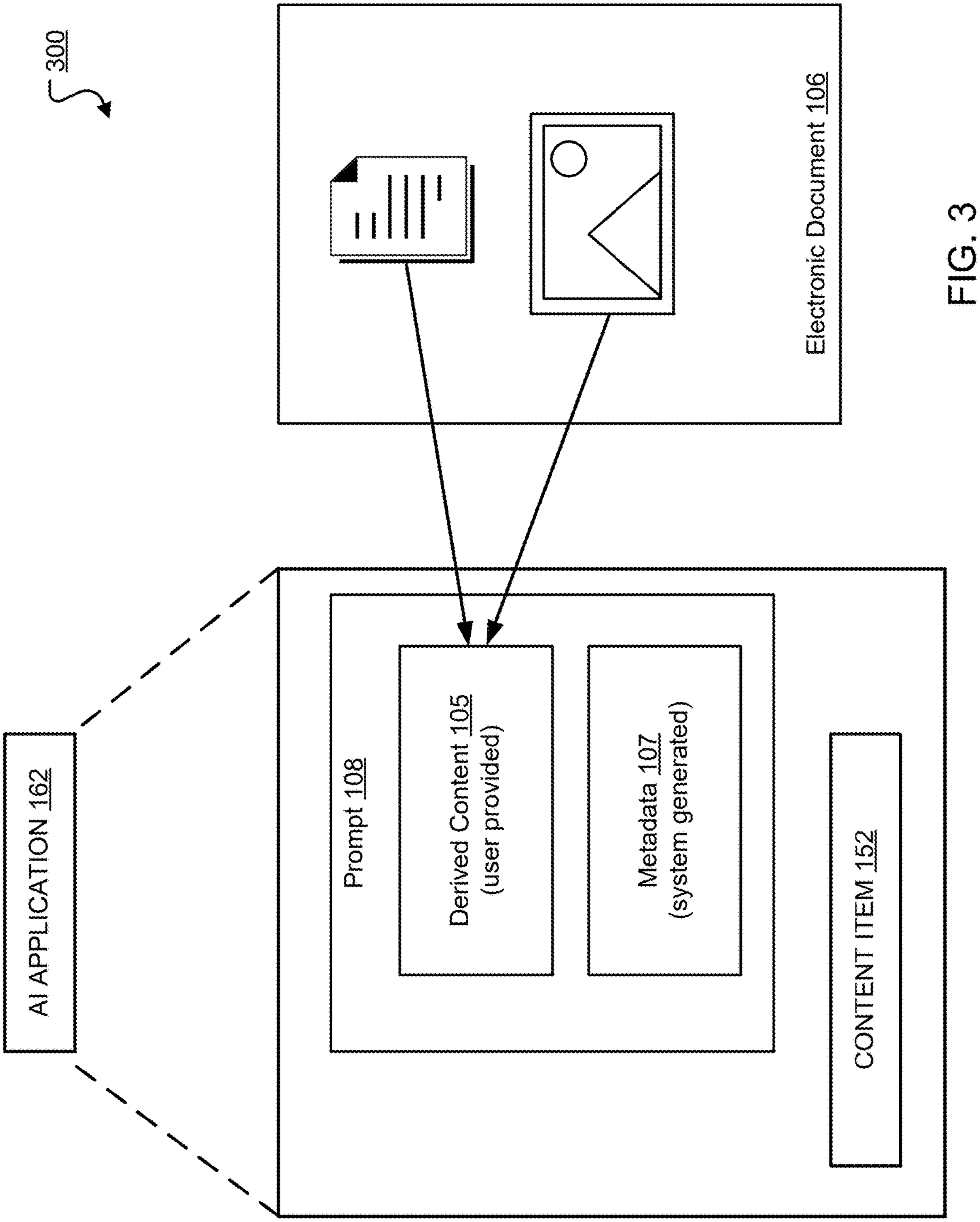
FIG. 3 is an example illustration of a content item generation system generating a content item based on a prompt that includes derived content and metadata.

Turning briefly to FIG. 3, which is an example illustration 300 of the content item generation system 100 generating a content item based on a prompt that includes derived content 105 and metadata 107. A user utilizes the AI application 162 to interact with the content item generation system 100 by using the AI application 162 to generate a prompt 108—and the generative neural network 110 processes the prompt 108 to generate the content item 152, which can then be presented within the AI application 162.

The prompt 108 includes content derived from a source electronic document 106. For example, as illustrated in FIG. 3, the derived content 105 can include text or image data transferred (e.g., copied or moved) by the user from the source electronic document 106.

Often, the prompt 108 also includes a request made by the user with reference to the derived content 105. For example, when the derived content 105 includes text data, the request can be a request to translate, explain, summarize, expand, analyze, or otherwise process the derived content 105. Additionally or instead, the request can be a request to generate data in some other modality, e.g., image data, video data, or audio data, conditioned on the derived content 105. As another example, when the derived content 105 includes image data, the request can be a request to generate a text caption or some other description of the derived content 105.

In response to the user providing the derived content 105, the content item generation system 100 obtains metadata 107 based on the derived content 105. To obtain the metadata 107, the content item generation system 100 can interact with one or more of: the search engine 120, the operating system 130, or the training system 140 included in the environment 200.

The search engine 120 can be any appropriate search engine that is accessible by the content item generation system 100 and that searches any appropriate corpus of documents, e.g., web pages, books, or other documents. For example, the search engine 120 can be an Internet search engine that searches through and returns results that reference electronic documents available on the Internet. As another example, the search engine 120 can be a different search engine that searches a private corpus of documents, e.g., electronic documents available on an internal network or stored in a collection of one or more databases.

In implementations where the search engine 120 is included in the environment 200, in response to the computing device 160 providing the context input 104 which includes derived content to the content item generation system 100, the content item generation system 100 can use the search engine 120 to perform a search in a corpus of documents based on the derived content, to identify an electronic document that is relevant to the derived content, e.g., that satisfies a relevance threshold with respect to the derived content. The content item generation system 100 can then use the identified electronic document as a source electronic document 106, and obtain metadata associated with the source electronic document 106.

The operating system 130 when included can run on the computing device 160. An operating system provides an interface between the computing device's hardware (e.g., the input/output devices and a processor executing instructions retrieved from a computer-readable medium) and software. The operating system provides a platform for the execution of various software applications on the computing device.

The software applications can include the AI application 162, as mentioned above, and one or more software applications provides transferring functionalities. Examples of transferring functionalities include copy commands, cut commands, paste commands, and so forth. Examples of such software applications include a word processing application, a spreadsheet application, a presentation application, a web browser application, an email application, a camera application, a photo album application, an image/video processing application, and so forth.

Examples of transfers can include the transfer of content between a source electronic document and a software application (e.g., between the source electronic document 106 and the AI application that can be utilized by the user to interact with the content item generation system 100), between two different electronic documents, between two different software applications, and so forth.

A user of the computing device 160 can select any content within a source electronic document 106 that is being presented within the AI application 162 (or another software application) on the display device of the computing device 160, provide a transfer request to transfer the selected content to the AI application 162 (optionally, through a system clipboard), and use the AI application 162 to provide a context input 104 that includes the transferred content to content item generation system 100. For example, the transfer request can include a copy request to copy the selected content from the source electronic document 106 to the AI application 162, or a cut request to move the selected content from the source electronic document 106 to the AI application 162.

In implementations where the operating system 130 is included in the environment 200, in response to the computing device 160 providing the context input 104 which includes the transferred content to the content item generation system 100, the content item generation system 100 can obtain metadata associated with the source electronic document 106, metadata associated with the transferred content, or both from the operating system 130, e.g., by way of making a data request to the operating system 130.

In some cases, the paste commands may include an augmented paste command which automatically transfers a predetermined set of content, e.g., provided by the content provider, in addition to the selected content. In these cases, the content item generation system 100 can still obtain the metadata, e.g., by way of making a data request to the operating system 130, which generally includes additional or different information than what would be included in the predetermined set of content. In fact, in some of these cases, the content item generation system 100 can remove the automatically transferred content, such that the context input includes the selected content but excludes the automatically transferred content.

The training system 140 is a system implemented as computer programs on one or more computers in one or more locations that trained the generative neural network 110 to determine the trained values of the set of generative neural network parameters. That is, the generative neural network 110 has been configured by training system 140 through training to be able to generate the content items 152 that include data in a single modality or multiple modalities by processing the prompts 108 in accordance with the trained values of the set of generative neural network parameters.

For example, the training system 140 can have trained the generative neural network 110 in two stages: a pre-training stage and a fine-tuning stage. In the pre-training stage, the generative neural network 110 is pre-trained by the training system 140 based on optimizing one or more unsupervised or self-supervised objective functions, e.g., a maximum-likelihood objective function, on a large pre-training dataset.

Examples of a large pre-training dataset include: a large dataset of text in one or more natural languages, e.g., text that is publicly available from the Internet or another text corpus, a large dataset of computer code in one or more programming languages, e.g., Python, C++, C#, Java, Ruby, PHP, and so on, e.g., computer code that is publicly available from the Internet or another code repository, a large dataset of audio samples, e.g., audio recordings or waveforms that represent the audio recordings, a large dataset of images where each image includes an array of pixels, a large dataset of videos where each video includes a temporal sequence of frames, or a large multi-modal dataset that includes a combination of two or more of these datasets.

In the fine-tuning stage, the pre-trained generative neural network 110 is then adjusted to the generative tasks through fine-tuning adaptation or another adaptation technique, e.g., prompt tuning or instruction tuning. The generative tasks can include any combination of one or more of the generative tasks mentioned above and possibly other tasks. Examples of fine-tuning adaptation technique include: supervised fine-tuning (SFT), reinforcement learning from human feedback (RLHF), reinforcement learning from AI feedback (RLAIF), and the like, that use different training objectives, different fine-tuning datasets, or both.

Some implementations of the training system 140 can additionally use low-rank adaptation techniques or some other techniques to achieve computational resource-efficient fine-tuning of the pre-trained generative neural network 110 by reducing the total number of parameter values that need to be learned during the fine-tuning stage.

By virtue of the training by the training system 140, the generative neural network 110 has a knowledge cutoff date. The knowledge cutoff date represents a most recent publication date of data included in the training data that has been used to train the generative neural network 110. Thus, the training data, e.g., the pre-training dataset or the fine-tuning dataset, used by the training system 140 to train only includes information up to the knowledge cutoff date, and not any up-to-date information that only becomes available after the knowledge cutoff date.

In implementations where the training system 140 is included in the environment 200, the content item generation system 100 can obtain from the training system 140 metadata associated with the generative neural network 110, which includes its knowledge cutoff date and possibly other information, e.g., model version, model size, and so on.

As part of the fine-tuning stage, in some implementations, the training system 140 can have trained the generative neural network 110 on a metadata-augmented training dataset using any of the fine-tuning adaptation techniques mentioned above.

For example, when the generative neural network 110 is a language model neural network, the metadata-augmented training dataset can include a plurality of training prompts. Each training prompt includes a training context input that includes content derived from a source electronic document and training metadata that includes metadata associated with the source electronic document.

As another example, when the generative neural network 110 is a diffusion model neural network, the metadata-augmented training dataset can include a plurality of training content items, e.g., image content items, video content items, or audio content items. Each training content item is associated with training metadata that includes metadata associated with a source electronic document from which the training content item is obtained.

Figure 4:
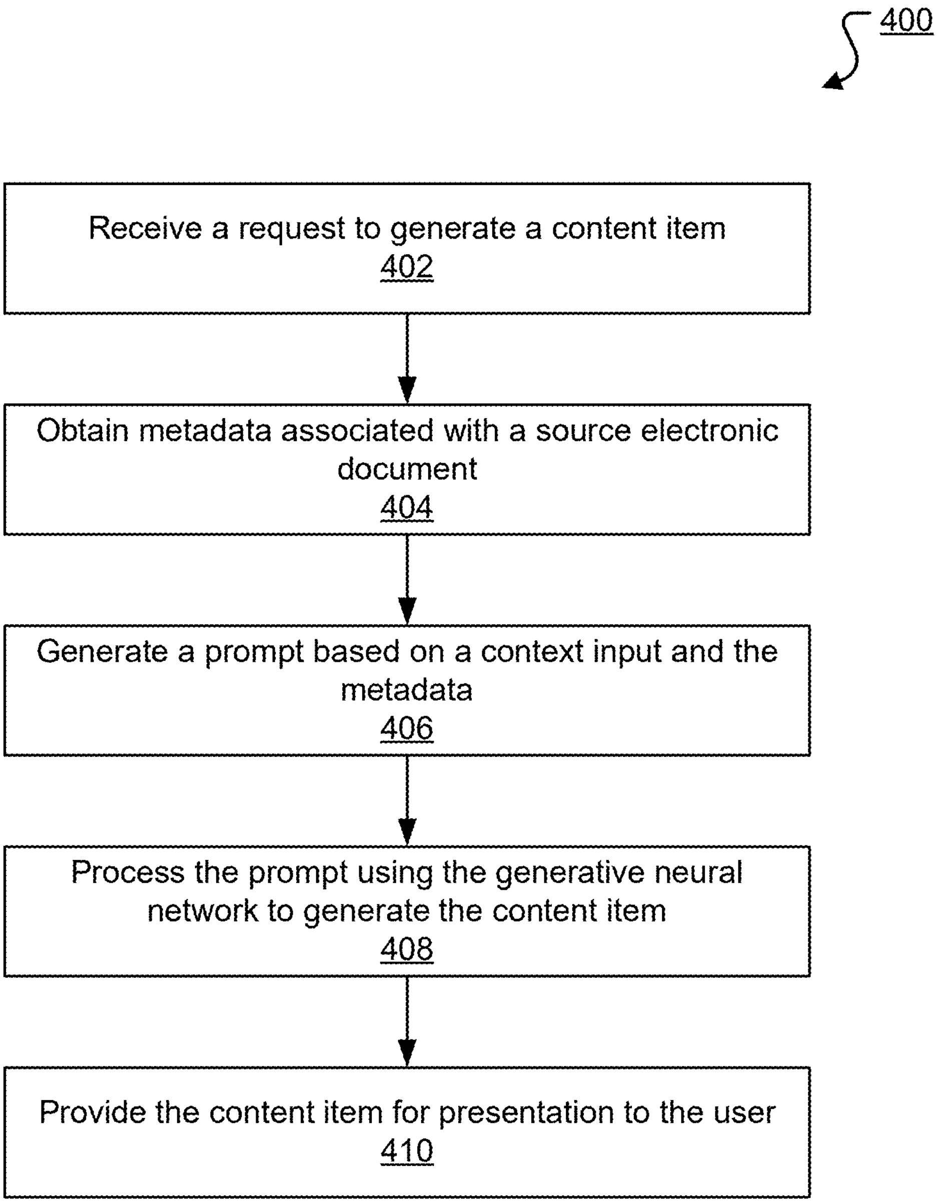
FIG. 4 is a flow diagram of an example process for generating a content item using a generative neural network based on source document metadata.

FIG. 4 is a flow diagram of an example process 400 for generating a content item using a generative neural network based on source document metadata. For convenience, the process 400 will be described as being performed by a system of one or more computers located in one or more locations. For example, a content item generation system, e.g., the content item generation system 100 depicted in FIG. 1, appropriately programmed in accordance with this specification, can perform the process 400.

The system receives, from a computing device, a request to generate a content item using a generative neural network conditioned on a context input (step 402). The system can use the generative neural network to generate any kind of content items, e.g., textual data items, image data items, video content items, audio data items, and so on.

The context input provides context for the content item to be generated by the generative neural network. The context input can include data provided by a user by using an input device of the computing device. In particular, the context input includes content derived from a source electronic document. For example, the context input can include a snippet of text (in a natural language or a computer language), an image (or a patch of an image), a video (or a frame of a video), or an audio (or a frame of an audio), that is transferred from a source electronic document.

The system obtains metadata associated with the source electronic document (step 404). For example, the system can obtain the metadata by using a search engine to perform a search in a corpus of documents based on the derived content to identify an electronic document that is relevant to the derived content, e.g., that satisfies a relevance threshold with respect to the derived content. The system can then use the identified electronic document as a source electronic document, and obtain metadata associated with the source electronic document. As another example, the system can make a data request to an operating system that is running on the computing device and obtain the metadata from the operating system.

Optionally, the system also obtains metadata associated with the derived content. For example, the system can similarly obtain the metadata from the operating system that is running on the computing device. Further optionally, the system also obtains metadata associated with the generative neural network. For example, the system can obtain the metadata from a training system that have trained the generative neural network or a database that maintains the metadata associated with the generative neural network.

The system generates a prompt for the generative neural network based on the context input, the metadata associated with the source electronic document, and, optionally, the metadata associated with the derived content or the metadata associated with the generative neural network (step 406). Thus, the prompt includes not only the context input that is directly provided by the user, but also additional information (the metadata obtained by the system) that is not directly provided by the user.

In some implementations, the system can generate the prompt by concatenating the context input and the obtained metadata. For example, the prompt can be of the form:

<context input> <metadata>, where "<context input>" represents the context input received from the user which includes the content derived from a source electronic document, and "<metadata>" represents the metadata associated with the source electronic document, the metadata associated with the derived content, the metadata associated with the generative neural network, or some combination of these. <metadata> can be arranged before <context input> in this example.

As another example, the prompt can be of the form:

<system prompt> <context input> <metadata >, where "<system prompt >" can represent additional information generated by the system based on the metadata. <system prompt>, <metadata>, and <context input> can be arranged in a different order in this example.

For example, the system can compare the knowledge cutoff date of the generative neural network to the publication date of the source electronic document and generate, as (part of) the system prompt, information that indicates whether the knowledge cutoff date predates the publication date.

As a concrete example of this, suppose that the publication date of the source electronic document is "2024-May-01" and the knowledge cutoff date of the generative neural network is "2024-March-01," then the information for inclusion in the system prompt could be formatted as a text sequence that represents a time difference: "the context is two months after knowledge cutoff".

As another example, the system can determine that the source electronic document is not included as part of the large pre-training dataset that has been used to pre-train the generative neural network. Nor is the source electronic document included in the fine-tuning datasets used to subsequently fine-tune the generative neural network. In some cases, such a determination can be made by the system after having determined that a specific content provider that provides the source electronic document in not within a list of known content providers that provide the data included in the pre-training and fine-tuning datasets.

In this example, the system can generate, as (part of) the system prompt, information that indicates that the source electronic document is not included in the training data on which the generative neural network has been trained. In some cases, the inclusion of such information will more likely cause the generative neural network to make use of a search engine (or another external tool) so as to more effectively generate the content item.

As a concrete example of this, suppose that the system determines that the source electronic document is not included in the training data, then the information for inclusion in the system prompt could be formatted as a text sequence that indicates to the generative neural network that the context input contains information that was not included in the training data used to train the generative neural network: "This information is from a set of data that was not used during the training."

In any example, the prompt can also include additional information, e.g., task specific information or other system-generated information, e.g., a predefined set of system instructions.

Additionally or alternatively, "<system prompt >" can represent a predetermined system prompt that includes, e.g., a set of predefined instructions about how the content item should be generated, a list of examples of content items to be generated, a list of search engine results obtained by using a search engine (or external data retrieved by the other external tool) based on the derived content included in the context input, and so on.

In some implementations, the system can provide the prompt for presentation to the user. If provided for presentation, the metadata can be presented together with, e.g., beside, the context input to the user. Alternatively, the metadata can be presented separate from the context input, such as in a footnote. Optionally, the metadata can be displayed as a short summary that is expandable upon selection (e.g., double click, hover, etc.) to display a more thorough presentation.

The system processes the prompt using the generative neural network to generate the content item (step 408). The generative neural network can generate any kind of content items, e.g., textual data items, image data items, video content items, audio data items, and so on.

In some implementations, the generative neural network has a set of generative neural network parameters and can generate the content item by processing the prompt in accordance with the set of generative neural network parameters.

Generally, as noted above, the inclusion of the metadata in the prompts enables the generative neural network to generate content items that are more informative and more pertinent to context inputs than content items generated based on the context inputs alone (despite that the same set of generative neural network parameters are used).

In some implementations, the generative neural network has a set of generative neural network parameters and a plurality of sets of adaptation parameters that correspond (or map) respectively to a plurality of predetermined use cases. Each set of adaptation parameters is an additional set of parameters that can be used together with the set of generative neural network parameters to adapt the generative neural network to generate the content item.

For example, the generative neural network can have a first set of adaptation parameters that corresponds to a first use case where the derived content included in the context input is after the knowledge cutoff date of the generative neural network, a second set of adaptation parameters that corresponds to a second use case where the derived content included in the context input is before the knowledge cutoff date of the generative neural network, and so on.

As another example, the generative neural network can have a first set of adaptation parameters that corresponds to a first use case where the content included in the context input is derived from a source electronic document provided by a first content provider, a second set of adaptation parameters that corresponds to a second use case where the content included in the context input is derived from a source electronic document provided by a second content provider, and so on.

In these implementations, the system can additionally make use of a classification neural network that is configured to classify a prompt into one of a plurality of predetermined use cases. For example, to generate the content item, the system can first process the metadata and, optionally, the context input using the classification neural network to generate a classification output that specifies a particular user case, and then process the prompt using both (i) the set of generative neural network parameters and (ii) a particular set of adaptation parameters that corresponds to the particular use case to generate the content item.

The system provides the content item for presentation to the user on a display device (step 410).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving, from a user, a request to generate a content item using a generative neural network conditioned on a context input, wherein the context input comprises content derived from a source electronic document;

obtaining metadata associated with the source electronic document, wherein obtaining the metadata comprises receiving the metadata from an operating system that is running on the one or more computers;

generating a prompt for the generative neural network based on the context input and the metadata associated with the source electronic document;

processing the prompt using the generative neural network to generate the content item; and providing the content item for presentation to the user.

2. The method of claim 1, wherein generating the prompt for the generative neural network comprises:

generating the prompt that comprises the context input and the metadata.

3. The method of claim 1, wherein obtaining the metadata associated with the source electronic document comprises:

performing a search in a corpus of documents to identify an electronic document that is relevant to the content; and using metadata associated with the identified electronic document as the metadata associated with the source electronic document.

4. The method of claim 1, wherein the content derived from the source electronic document comprises content copied from the source electronic document.

5. The method of claim 1, wherein the generative neural network comprises a multi-modal neural network.

6. The method of claim 1, wherein the metadata associated with the generative neural network comprises a cutoff date of the generative neural network, the cutoff date representing a most recent publication date of data included in the training data used to train the generative neural network.

7. A method performed by one or more computers, the method comprising:

receiving, from a user, a request to generate a content item using a generative neural network conditioned on a context input, wherein the context input comprises content derived from a source electronic document;

obtaining metadata associated with the source electronic document;

generating a prompt for the generative neural network based on the context input and the metadata associated with the source electronic document, wherein the prompt comprises the context input, the metadata, and additional information that is generated based on the metadata associated with the source electronic document and metadata associated with the generative neural network;

processing the prompt using the generative neural network to generate the content item; and providing the content item for presentation to the user.

8. The method of claim 7, wherein the metadata associated with the generative neural network comprises a cutoff date of the generative neural network, the cutoff date representing a most recent publication date of data included in the training data used to train the generative neural network.

9. The method of claim 7, wherein the generative neural network comprises a multi-modal neural network.

10. The method of claim 7, wherein the content derived from the source electronic document comprises content copied from the source electronic document.

11. A system comprising one or more computers and one or more storage devices storing instructions that, when executed by the one or more computers, cause the one or more computers to perform operations comprising:

receiving, from a user, a request to generate a content item using a generative neural network conditioned on a context input, wherein the context input comprises content derived from a source electronic document;

obtaining metadata associated with the source electronic document, wherein obtaining the metadata comprises receiving the metadata from an operating system that is running on the one or more computers;

generating a prompt for the generative neural network based on the context input and the metadata associated with the source electronic document;

processing the prompt using the generative neural network to generate the content item; and providing the content item for presentation to the user.

12. The system of claim 11, wherein generating the prompt for the generative neural network comprises:

generating the prompt that comprises the context input and the metadata.

13. The system of claim 11, wherein obtaining the metadata associated with the source electronic document comprises:

performing a search in a corpus of documents to identify an electronic document that is relevant to the content; and using metadata associated with the identified electronic document as the metadata associated with the source electronic document.

14. The system of claim 11, wherein the content derived from the source electronic document comprises content copied from the source electronic document.

15. The system of claim 11, wherein the generative neural network comprises a multi-modal neural network.

16. The system of claim 11, wherein the metadata associated with the generative neural network comprises a cutoff date of the generative neural network, the cutoff date representing a most recent publication date of data included in the training data used to train the generative neural network.

17. A system comprising one or more computers and one or more storage devices storing instructions that, when executed by the one or more computers, cause the one or more computers to perform operations comprising:

receiving, from a user, a request to generate a content item using a generative neural network conditioned on a context input, wherein the context input comprises content derived from a source electronic document;

obtaining metadata associated with the source electronic document;

generating a prompt for the generative neural network based on the context input and the metadata associated with the source electronic document, wherein the prompt comprises the context input, the metadata, and additional information that is generated based on the metadata associated with the source electronic document and metadata associated with the generative neural network;

processing the prompt using the generative neural network to generate the content item; and providing the content item for presentation to the user.

18. The system of claim 17, wherein the metadata associated with the generative neural network comprises a cutoff date of the generative neural network, the cutoff date representing a most recent publication date of data included in the training data used to train the generative neural network.

19. The system of claim 17, wherein the generative neural network comprises a multi-modal neural network.

20. The system of claim 17, wherein the content derived from the source electronic document comprises content copied from the source electronic document.

21. One or more non-transitory computer storage media storing instructions that, when executed by one or more computers, cause the one or more computers to perform operations comprising:

receiving, from a user, a request to generate a content item using a generative neural network conditioned on a context input, wherein the context input comprises content derived from a source electronic document;

obtaining metadata associated with the source electronic document, wherein obtaining the metadata comprises receiving the metadata from an operating system that is running on the one or more computers;

generating a prompt for the generative neural network based on the context input and the metadata associated with the source electronic document;

processing the prompt using the generative neural network to generate the content item; and providing the content item for presentation to the user.

22. The computer storage media of claim 21, wherein generating the prompt for the generative neural network comprises:

generating the prompt that comprises the context input and the metadata.

23. The computer storage media of claim 21, wherein obtaining the metadata associated with the source electronic document comprises:

performing a search in a corpus of documents to identify an electronic document that is relevant to the content; and using metadata associated with the identified electronic document as the metadata associated with the source electronic document.

24. The computer storage media of claim 21, wherein the generative neural network comprises a multi-modal neural network.

25. The computer storage media of claim 21, wherein the metadata associated with the generative neural network comprises a cutoff date of the generative neural network, the cutoff date representing a most recent publication date of data included in the training data used to train the generative neural network.

26. The computer storage media of claim 21, wherein the content derived from the source electronic document comprises content copied from the source electronic document.

27. One or more non-transitory computer storage media storing instructions that, when executed by one or more computers, cause the one or more computers to perform operations comprising:

receiving, from a user, a request to generate a content item using a generative neural network conditioned on a context input, wherein the context input comprises content derived from a source electronic document;

obtaining metadata associated with the source electronic document;

generating a prompt for the generative neural network based on the context input and the metadata associated with the source electronic document, wherein the prompt comprises the context input, the metadata, and additional information that is generated based on the metadata associated with the source electronic document and metadata associated with the generative neural network;

processing the prompt using the generative neural network to generate the content item; and providing the content item for presentation to the user.

28. The computer storage media of claim 27, wherein the metadata associated with the generative neural network comprises a cutoff date of the generative neural network, the cutoff date representing a most recent publication date of data included in the training data used to train the generative neural network.

29. The computer storage media of claim 27, wherein the generative neural network comprises a multi-modal neural network.

30. The computer storage media of claim 27, wherein the content derived from the source electronic document comprises content copied from the source electronic document.

* * * * *